Aug. 27, 1963
C. PAVONE
3,101,615
FLOWMETER
Filed Feb. 2, 1960
2 Sheets-Sheet 1
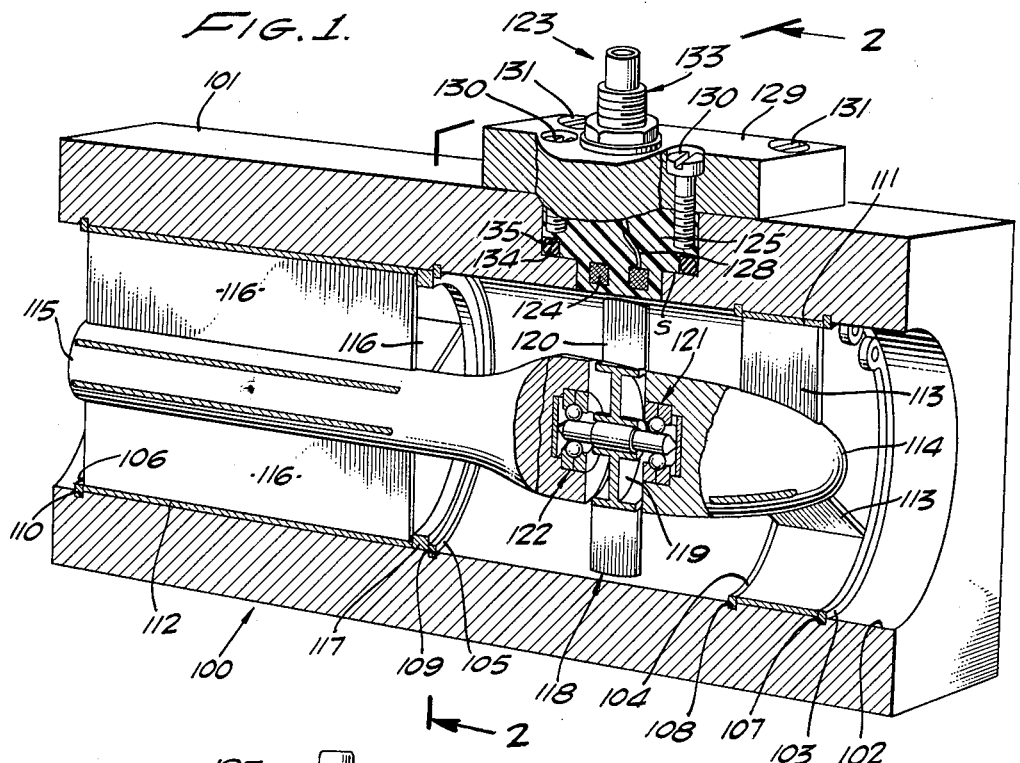
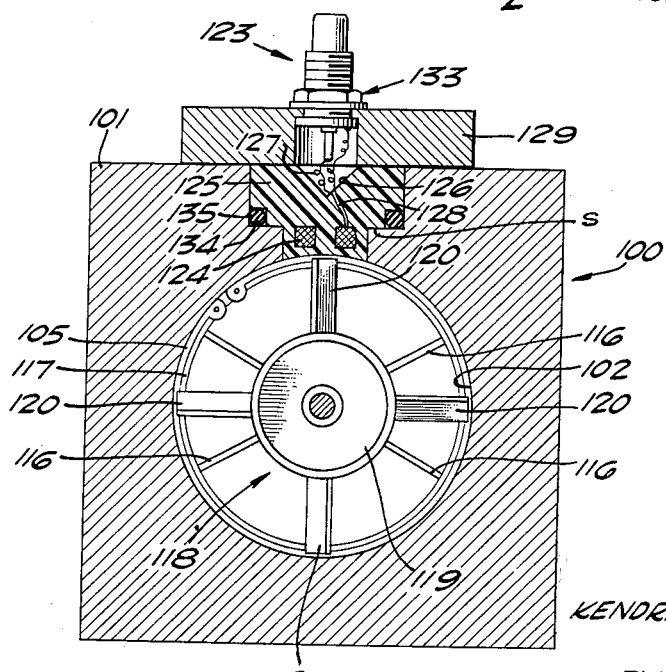
CARLO PAVONE,
INVENTOR.
KENDRICK, SCHRAMM & STOLZY
BY Donald Stolzy
ATTORNEYS Aug. 27, 1963

C. PAVONE 3,101,615

FLOWMETER

Filed Feb. 2, 1960

CARLO PAVONE,
INVENTOR
KENDRICK, SCHRAMM & STOLZY
BY J. Donald Stolzy
ATTORNEYS

United States Patent Office 3,101,615
Patented Aug. 27, 1963

3,101,615
FLOWMETER
Carlo Pavone, North Hollywood, Calif., assignor to Dresser Industries, Inc., Dallas, Tex., a corporation of Delaware
Filed Feb. 2, 1960, Ser. No. 6,222
7 Claims. (Cl. 73—231)

This invention relates to apparatus for producing an output signal representative of a rotational movement, and more particularly to devices such as turbine-type flowmeters, and means for producing an output signal each time the turbine blades of such meters rotate through a predetermined angle, whereby the total fluid flow and rate of flow of fluid passing through the flowmeter may be determined.

Although the invention will of course have other applications, it has been found particularly useful in indicating the total volume and rate of volume flow passing through a turbine-type flowmeter.

Turbine-type flowmeters generally are constructed of hollow, elongated housings in which a shaft is centrally mounted. The shaft is provided with fan-type, pitched blades which are rotatable on or with and extend radially from it. Thus, as fluid flows through the housing, the blades turn continuously in one direction for a number of revolutions which is a function of the total volume of fluid flow through the housing. The rotational velocity of the shaft and blades is a function of the volume rate of fluid flow through the housing. Many turbine-type flowmeters may be employed in accordance with the invention. Some of these are illustrated in U.S. Patents Numbers 2,683,224 and 2,728,893. In order that turbine-type flowmeters may be usefully employed, it is necessary to detect the rotation of the turbine shaft and blades. Conventionally, this is done by placing a "pick-up" at one point around the interior of the flowmeter housing at the axial position of the turbine blades to lie contiguous to them as they rotate past and to produce an electrical output voltage pulse each time a blade passes by the position of the pick-up. The number of pulses generated is thereby representative of the total volume of fluid flowing through the housing and the number of pulses per unit time is representative of the volume rate of fluid flow through the housing.

In the past, two types of pick-ups have generally been used with turbine-type flowmeters. These two types are known as photoelectric and magnetic pick-ups. When a photoelectric pick-up is employed, the ends of the turbine blades of the flowmeter are generally positioned to interrupt light emanating from a lamp and passing through a lens in a sidewall of the housing and illuminating a photocell. The turbine blades interrupt the light periodically to produce output pulses of an identical repetition frequency.

A magnetic pick-up consists of an assembly of an inductive winding with a core made of a permanent magnet. The whole assembly is located with its axis radially at the periphery of the rotating impeller whose blades must be made of a ferromagnetic material. As each blade passes by, the magnetic flux is disturbed, causing an induced electromotive force in the coil proportional to the rate of movement of the blade.

When either a photoelectric or a magnetic pick-up is used, the number of pulses produced is representative of total fluid flow and the number of pulses per unit time produced is representative of rate of fluid flow. However, the photoelectric and magnetic flowmeter pick-ups of the prior art unfortunately have mutually exclusive disadvantages. For example, the output pulses produced by a magnetic pick-up are proportional to the turbine speed because the voltage induced in the inductive winding is proportional to the rate of change of magnetic flux which links it due to the rotation of the ferromagnetic turbine blades. This is a serious limitation upon the magnetic pick-up as regards detection of low flow rates. That is, slow movement of the turbine blades past the inductive winding cannot be detected without additional electronic equipment such as amplifiers because at slow speed the b.m.f. generated will be very small. Still further, with high gain amplification, noise begins to present further difficult problems.

The use of a permanent magnet core in a magnetic pick-up causes one of the ferromagnetic turbine or impeller blades to align itself with the inductive winding when the fluid flow rate through the flowmeter housing is exactly zero. This same magnetic field force is also cumulative with the force of friction in the shaft bearings. This makes such a flowmeter completely insensitive to a low rate of fluid flow.

In addition to the "threshold" holding effect of the permanent magnets of a magnetic pick-up, at slightly higher fluid flow rates, the impeller blades tend to "jump," one at a time, toward the magnetic pick-up. This means that both the overall and instantaneous accuracy of the instrument are also seriously impaired. Although photoelectric pick-ups have none of the above-described disadvantages of magnetic pick-ups, photoelectric pick-ups themselves have one extremely serious disadvantage. This is the fact that their sensitivity is seriously impaired when they are used in turbine-type flowmeters for measuring the flow of relatively dark or opaque fluids. Obviously, light cannot be efficiently transmitted therethrough to the turbine blades and thence to the photocell used therewith.

The present invention overcomes all the above-described and other disadvantages of the prior art by providing a framework, a member having at least one radially extending metal projection, means mounting said member on said framework in a manner to permit rotation of said member indefinitely in one direction about an axis other than that of the projection, a radio frequency oscillator having a tank circuit including an inductor, and means mounting the inductor in a fixed position relative to the framework to lie contiguous to the metal of the projection only upon rotation of the member to one predetermined position.

In a preferred embodiment of the invention, a flowmeter is provided including a hollow, metal housing, a flowmeter turbine or impeller having a plurality of pitched metal blades extending radially in the housing, means mounting the impeller in the housing in a manner to permit rotation of the impeller indefinitely in one direction about the longitudinal axis of the housing with the blades extending outwardly therefrom approximately perpendicular thereto, a radio frequency oscillator having a tank circuit including an inductor, the oscillator being of a type such that it will stop oscillating due to the decrease in the quality of the tank circuit by presence of one of the metal blades in proximity to the inductor, a rectifier connected from the output of the oscillator, and a dielectric block extending around the inductor, the inductor being maintained in a fixed position relative to, but spaced from the housing to lie contiguous to the metal blades with its axis in approximately the same plane as and extending toward the blades as the impeller is rotated. Although the sensitivity of the instrument is good if the oscillator stops oscillating, it is not necessary that such be the case to practice the present invention. Any percentage of modulation of the oscillator frequency by effect of the presence of a blade can be used.

From the foregoing, it will be appreciated that the output of the rectifier will be discrete voltage pulses. The number of pulses will then represent total fluid flow and the number per unit time will represent rate of fluid flow.

It is to be noted that a pick-up is provided in accordance with the invention which has all of the above-described advantages of a photoelectric pick-up over a magnetic pick-up and does not have any of the above-stated disadvantages of the former. That is, the sensitivity of the flowmeter of the invention is not impaired when it is used for measuring the flow of dark or opaque fluids, because it is the eddy current power loss in the turbine blades which loads the oscillator and reduces the quality of the tank circuit thereof to block the output thereof, this not being affected by the color or clarity of the fluid being measured.

The flowmeter of the invention does not have the abovestated disadvantages of one employing a magnetic pick-up for the following reasons. As in the prior art the flowmeter pick-up of the present invention produces an output pulse each time a turbine blade passes the pick-up coil; however, the amplitude of each output pulse is always the same even when the impeller blades move at an infinitely slow speed. This is true because it is the radio-frequency eddy current loss produced by the passage of each turbine blade that produces the pulses. Thus, the use of a high gain amplifier and clipper, necessary with magnetic pick-ups for high sensitivity at low speeds, is obviated by the present invention.

Also, as in the case of photoelectric pick-ups, the flowmeter pick-up of the invention does not have the "threshold" or low speed averaging or instantaneous error indication of permanent magnet pick-ups which cause the turbine blades to align themselves with the magnetic pick-up coil.

Still further, the power supplied to the flowmeter pick-up coil of the invention can be of the order of microwatts, whereas the power involved in the use of photoelectric and magnetic pick-ups at the point of measurement can be of the order of watts and milliwatts, respectively. This means that a hazard created in measuring the flow of highly inflammable fluids is reduced by the present invention over that which exists in measuring such fluids by flowmeters incorporating either magentic or photoelectric pick-ups.

It is also an advantage that the flowmeter pick-up of the invention is inherently a telemetering device because a radio-frequency oscillator is employed which can be used as a transmitter source to radiate electromagnetic wave energy modulated by the passage of the blades to a receiver remote from the position of the flowmeter pick-up of the invention. It is another advantage of the invention that because of reduced impeller drag it is possible to achieve absolute linearity over a wider flow range.

The invention will be better understood when the following description is considered in connection with the accompanying drawings.

In the drawings, which are to be regarded as merely illustrative:

FIG. 1 is a longitudinal sectional view of the flowmeter of the invention;

FIG. 2 is a transverse sectional view of the flowmeter taken on the line 2—2 shown in FIG. 1;

Figure 4:
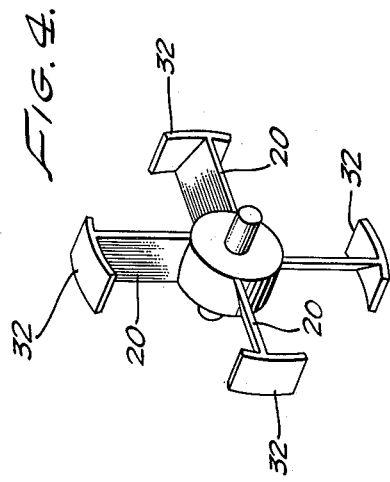
FIG. 4 is a perspective view of still another type of impeller which may be employed with the flowmeter shown in FIGS. 1 and 2.

In the drawings, in FIG. 1 a flowmeter 100 is shown, including a square housing 101 having a cylindrical passageway 102 therethrough. The impeller portion of the flowmeter of the invention is mounted in the cylindrical passageway 102 and stabilized axially therein by means of four snap rings 103, 104, 105 and 106, located respectively in annular grooves 107, 108, 109 and 110 in the internal wall of passageway 102.

Snap rings 103 and 104 stabilize axial movement of a cylindrical body member 111. Snap rings 105 and 106 stabilize the axial movement of cylindricl body member 112. Body member 111 has three output vanes 113 welded to it to support a downstream streamlined body 114. Body member 112 has similar vanes 116 welded to it to support a forward streamlined body 115. A sharp edged orifice 117 is positioned between the downstream ends of flow straightening vanes 116 and the snap ring 105. The sharp edged orifice 117 has the function of reducing upstream effects and increasing the turbulent flow range. The members 114 and 115 rotatably support a flowmeter impeller 118 which comprises a rotor 119 having pitched metal blades 120 fixed thereto, rotor 119 being rotatably mounted in members 114 and 115 in ball bearings 121 and 122, respectively. Blades 120 may be made of any metal.

The rotation of impeller 118 is detected by a pick-up 123, which includes a radio-frequency inductor coil 124 molded integrally in a solid cylindrical dielectric member 125. Dielectric member 125 is provided with a conical cavity 126 to receive folded ends 127 of leads 128 from inductor 124. Dielectric member 125 is fixed to a metal mounting plate 129 by means of cap screws 130. Mounting plate 129 is fixed to housing 101 by means of cap screws 131. Electrical leads 128 are soldered to a conventional coaxial cable plug 133.

It is to be noted that the distance from a shoulder S on dielectric member 125 to the top thereof will be a few thousands greater than the corresponding dimension of housing 101. Thus, dielectric member 125 always firmly seats in housing 101.

The cylindrical surface of dielectric member 125 is sealed to the mating cylindrical surface of housing 101 by an O-ring 134 which is lodged on a groove 135 in dielectric member 125. It is to be noted that, as best shown in FIG. 2, the lower end surface of dielectric member 125 is milled to conform to the cylindrical shape of passageway 102 in housing 101.

Figure 3:
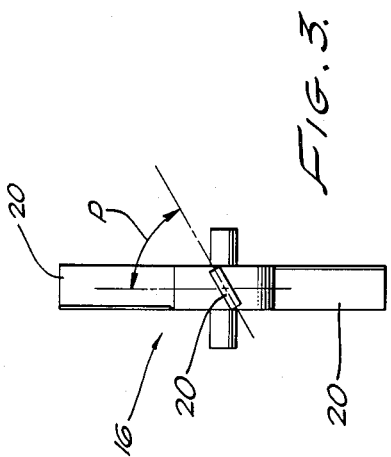
FIG. 3 is a side elevational view of an alternative impeller which could be employed with the flowmeter of the invention shown in FIGS. 1 and 2.

An impeller 16 is shown in FIG. 3 to illustrate pitch P of blades 20.

Although the impeller 118 shown in FIGS. 1 and 2 is entirely adequate for practicing the invention as illustrated in FIGS. 1 and 2, if greater tank circuit loading is desired, each of the blades 20 shown in FIGS. 3 and 4 may be provided with a circumferentially extending appendage 32 as shown in FIG. 4. Laminar or streamlined flow of fluid between the blades 20 of such an impeller may be impaired by the use of material at 32, as shown in FIG. 4. Hence, this alternative construction is certainly not necessary to practice the other features of the invention, and in some cases may not be preferable.

Figure 5:
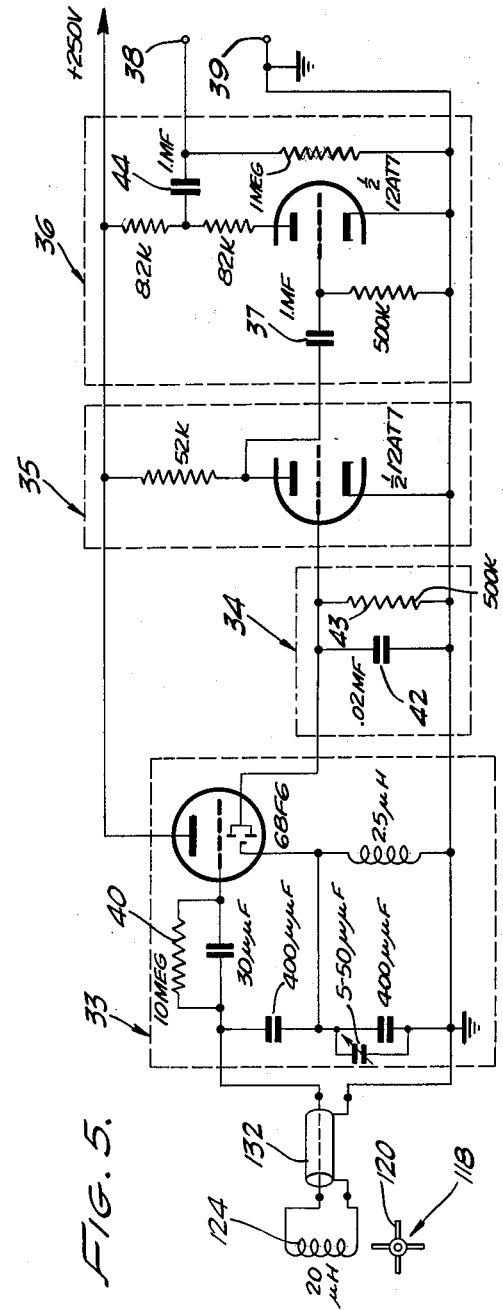
FIG. 5 is a schematic diagram of the flowmeter pick-up of the invention and its associated electrical circuitry.

In FIG. 5, the impeller 118 with inductor coil 124 and a coaxial cable 132 are illustrated schematically with remaining circuitry which is employed in the preferred embodiment of the invention. The invention is employed with a conventional Colpitts oscillator 33 having a detector 34 connected from the output thereof to a pair of cascaded amplifiers 35 and 36. Amplifier 35 is directly coupled from the output of detector 34 and amplifier 36 is capacitively coupled at 37 from amplifier 35. The output of amplifier 36 may be taken at output terminals 38 and 39.

Circuit values illustrated in the drawings may be employed in one particular embodiment of the invention where it is desired that oscillator 33 oscillate at a frequency of about 2.2 megacycles per second and be completely cut off by loading of inductor coil 124 when a blade 120 of impeller 118 is in proximity thereto. The output voltage of terminal 38 with respect to grounded terminal 39 will be of approximately rectangular waveform and of a peak to peak amplitude approximately equal to 20 volts, if the power supplied is 250 volts D.C.

Oscillator 33 is conventional Colpitts oscillator employing simply an effect series diode as a part of a triode-diode 6BF6 tube combination and parallel connected smoothing capacitor 42 and output resistor 43. Amplifiers 35 and 36 are obviously conventional. Amplifier 35 utilizes the triode part of the 6BF6 tube. A coupling capacitor 44 is provided at the output of the amplifier 36.

From the foregoing, it will be appreciated that the voltage appearing at the output terminal 38 with respect to the output terminal 39 will be of approximately rectangular waveform. The number of the pulses will be representative of the total fluid flow through the housing 101 and the number of pulses per unit time will be representative of the rate of fluid flow through the housing 101.

It will also be noted that the flowmeter of the invention overcomes all of the disadvantages of both the photoelectric and magnetic pick-ups described hereinbefore, as well as other disadvantages of the prior art. In the first place, it will be noted that the output of the flowmeter of the invention is not impaired when it is used for measuring the flow of dark or opaque fluid. It is simply the eddy current loss in blades 120 of the impeller 118 whcih causes the tank circuit of the oscillator 33, including coil 124, to be loaded so heavily that the oscillator 33 will, in fact, not oscillate. At this point, the output of detector 34 is therefore zero. Obviously, eddy current loss in blades 120 of the impeller 118 will not be affected by the opaque character or the color of the fluid passing through housing 101.

Still further, it is to be noted that the amplitude of the output pulses of detector 34 are independent of the angular velocity of the impeller 118. The oscillation frequency of oscillator 33 will be over ten times and ordinarily extremely higher than the angular velocity of impeller 118 in revoutions per unit time, times the number of blades 120 thereof. Thus, any voltage induced in coil 124 due to the passage of current therethrough at radio frequencies will not affect the output of detector 34 to any measurable degree. Along these same lines, it is to be noted that no high-gain amplifier need be employed as in the case of magnetic pick-ups of the prior art where it is desired to indicate low impeller angular velocity.

In addition to the foregoing, it is to be noted that the pick-up of the invention does not have the "threshold" or low speed average or instantaneous error indication effect of permanent magnetic type pick-ups for turbine-type flowmeters.

The power supplied to inductor coil 124 by oscillator 33 is of the order of microwatts, whereas the power involved in operating photoelectric or magnetic pick-ups can be of the order watts and milliwatts, respectively. This means that the hazard created in measuring the flow of highly inflammable fluids is reduced by the use of the present invention over that which exists by the use of the prior are photoelectric and magnetis pick-ups.

Still further, it is to be noted that since radio-frequency oscillator 33 modulated by the passage of the blades is employed, the flowmeter of the invention is inherently a telemetering device.

Although only a few specific embodiments of the invention have been illustrated, it is to be understood that the invention is not to be limited thereby, the true scope thereof being defined only in the appended claims.

1. Apparatus for producing an output signal representative of a rotational movement, said apparatus comprising:
   a frame;
   a member having at least one radially extending metal projection;
   means mounting said member on said framework in a manner to permit rotation of said member indefinitely in one direction about an axis other than that of said projection;
   said member being arranged to receive a force that produces rotational movement of said member;
   a radio frequency oscillator having a tuned circuit that controls the oscillator frequency including an inductor disposed substantially free of magnetic coupling to any other coil;
   a dielectric member extending through said inductor; and
   means supporting said inductor in a fixed position relative to said framework to be contiguous to the metal of said projection only upon rotation of said projection-bearing member to one predetermined position, whereby the reactance of said inductor is altered when said projection moves into said one predetermined position, thereby altering the output signal from said oscillator and so indicating rotation of said projection-bearing member.

2. Apparatus, as described in claim 1, wherein, said oscillator is normally oscillating and stops oscillating only when said projection is in said one predetermined position.

3. Apparatus for producing an output signal representative of an angular movement, said apparatus comprising: an elongated, hollow, metal housing; a member having at least one radially extending metal projection; means mounting said member in said housing in a manner to permit rotation of said member indefinitely in one direction about the longitudinal axis of said housing with said projection being disposed at an angle relative thereto, wherein said rotation is in response to fluid flow through said housing; a radio-frequency oscillator having a tank circuit including a single inductor; and a dielectric block extending through and around said inductor, said inductor being maintained in a fixed position relative to but spaced from said housing to lie contiguous to the metal of said projection only upon rotation of said member to one predetermined position, whereby the quality of said tank circuit is decreased when said projection moves into said one predetermined position, thereby reducing the output signal from said oscillator and so indicating angular movement of said member.

4. A flowmeter comprising: an elongated, hollow housing; a member having a plurality of pitched metal blades extending radially in said housing; means mounting said member in said housing in a manner to permit rotation of said member indefinitely in one direction about the longitudinal axis of said housing with said blades extending outwardly therefrom approximately perpendicular thereto, wherein said rotation is in response to fluid flow through said housing; a radio-frequency oscillator having a tank circuit including a single inductor; a dielectric member extending through said inductor; and means mounting said inductor in a fixed position relative to said housing to lie contiguous to said metal blades with its axis in approximately the same plane as and extending toward said blades as said member is rotated, whereby the quality of said tank circuit is decreased when one of said blades is moved into a position contiguous to said inductor, thereby decreasing the output signal from said oscillator, said reduction in amplitude being a measure of fluid flow.

5. Apparatus for producing repetitive output signals representative of an angular movement, said apparatus comprising: an elongated, hollow, housing; a member having at least one radially extending unmagnetized metal projection; means mounting said member in said housing in a manner to permit rotation of said member indefinitely in one direction about the longitudinal axis of said housing with said projection being disposed at an angle relative thereto wherein said rotation is in response to fluid flow through said housing; and a radio-frequency oscillator having a tank circuit including a single inductor; a dielectric member extending through said inductor; said oscillator being of a type such that it will stop oscillating due to the decrease in the quality of said tank circuit by the presence of said projection in proximity to said inductor during said angular movement; said inductor being maintained in a fixed position relative to but spaced from said housing to lie contiguous to the metal of said projection only upon rotation of said member to one predetermined position.

6. A flowmeter comprising: an elongated, hollow, housing; a member having a plurality of unmagnetized pitched metal blades whose angular movement is a measure of flow extending radially in said housing; means mounting said member in said housing in a manner to permit rotation of said member indefinitely in one direction about the longitudinal axis of said housing with said blades extending outwardly therefrom approximately perpendicular thereto; a radio-frequency oscillator having a tank circuit including a single inductor, a dielectric member extending through said inductor; said oscillator being of a type such that its output will be reduced in amplitude due to the decrease in the quality of said tank circuit by the successive presence of said metal blades in proximity to said inductor, said reduction in amplitude being a measure of fluid flow; a rectifier connected from the output of said oscillator; and a dielectric block extending around and through said inductor, said inductor being maintained in a fixed position relative to, but spaced from, said housing to lie contiguous to said metal blades with its axis in approximately the same plane as and extending toward said blades as said member is rotated.

7. A flowmeter comprising: an elongated, hollow, housing; a member having a plurality of unmagnetized pitched metal blades whose angular movement is a measure of flow extending radially in said housing; means mounting said member in said housing in a manner to permit rotation of said member indefinitely in one direction about the longitudinal axis of said housing with said blades extending outwardly therefrom approximately perpendicular thereto; a radio-frequency oscillator having a tank circuit including a single inductor, said oscillator being of a type such that its output will be modulated by the successive presence of said metal blades in proximity to said inductor, said modulated output being a function of fluid flow; a rectifier connected from the output of said oscillator; and a dielectric block extending around and through said inductor, said inductor being maintained in a fixed position relative to, but spaced from, said housing to lie contiguous to said metal blades with its axis in approximately the same plane as and extending toward said blades as said member is rotated.

References Cited in the file of this patent

UNITED STATES PATENTS

| | | |
|---|---|---|
| 2,325,927 | Wilbur | Aug. 3, 1943 |
| 2,728,893 | Bartlelink | Dec. 27, 1955 |
| 2,943,487 | Potter | July 5, 1960 |
| 2,974,525 | Cole | Mar. 14, 1961 |

OTHER REFERENCES

Journal of Scientific Instruments; vol. 32, September 1955; Article by M. J. Wilkie, pp. 350–353, 73–231.